FIG.1.

3,272,917
FIRST AND SECOND ORDER DIFFRACTION COLOR PROJECTION SYSTEM
William E. Good, Liverpool, Thomas T. True, Camillus, and Henry J. Vanderlaan, Liverpool, N.Y., assignors to General Electric Company, a corporation of New York
Filed Feb. 11, 1964, Ser. No. 343,990
13 Claims. (Cl. 178—5.4)

This invention relates in general to color projection systems, and in particular to an improved system for simultaneously varying point by point the intensity of the primary color components in a beam of light in response to a plurality of simultaneous electrical signals, each corresponding point by point to the intensity of a respective primary color component of an image to be projected by such beam.

One such system for controlling the intensity of a beam of light includes a light modulating medium which is adapted to deviate each portion of the beam in accordance with deformations in a respective point thereof on which the portion is incident, and a light mask having a plurality of apertures therein disposed to mask the beam of light in the absence of any deformation in the light modulating medium and to pass light in accordance with the deformations in said medium. The intensity of the portions of the beam of light deviated by the light modulating medium and passed through the apertures in the light mask varies in accordance with the magnitude of deformations produced in the light modulating medium.

The light modulating medium may be a thin light transmissive layer of oil in which is formed a phase diffraction grating having adjacent valleys spaced apart by a predetermined distance. Each portion of the beam of light incident on a respective small area or point of the medium is deviated in a direction orthogonal to the direction of the valleys. The intensity of the deviated light is a function of the depth of the valleys.

The phase diffraction grating may be formed in the layer of oil by the deposition thereon of electrical charges, for example, by a beam of electrons. The beam may be directed on the medium and deflected along the surface thereof in one direction at successively spaced intervals perpendicular or othogonal to the one direction. Concurrently the rate of deflection in the one direction may be altered periodically at a frequency considerably higher than the frequency of scan to produce alterations in the electrical charges deposited on the medium along the direction of scan. The concentrations of electrical charge in corresponding parts of each line of scan form lines of electrical charges which are attracted to a suitably disposed oppositely charged transparent conducting plate on the other surface of the layer thereby producing a series of valleys therein. As the periodic variations in the rate of scan are changed in amplitude, the depth of the valleys are correspondingly changed. Thus, with such a means each element of a beam of light impinging on one of the opposed surfaces of the layer is deflected orthogonally to the direction of the valleys or lines therein by an amount determined by the spacing of the valleys, and the intensity of an element of deflected light is a function of the depth of such valleys.

When a beam of white light, which is constituted of primary color components of light, is directed on a diffraction grating, light emerging therefrom is dispersed into a series of spectra on each side of a line representing the direction or path of the undeviated light. The first pair of spectra on each side of the undeviated path of light are referred to as first order diffraction patterns. The next pair of spectra on each side of the undiffracted path are referred to as second order diffraction patterns, and so on. In each order of the spectrum the blue light is deviated the least and the red light the most. The angle of deviation of red light in the first order pattern, for example, is that angle measured with reference to the undeviated path at which the ratio of the wave length of red light to the line to line spacing of the grating is equal to the sine of the deviation angle. The angle of deviation of the red light in the second order pattern is that angle at which the ratio of twice the wave length of red light to the line to line spacing of the grating is equal to the sine of the angle, and so on.

If the beam of light is oblong in shape, each of the spectra is constituted of components which are oblong in shape. If the diffracted light is directed onto a mask having a wide transparent slot appropriately located thereon, the light passed through the slot is essentially reconstituted white light, each portion of which is of an intensity corresponding to the depth of the valleys illuminated by such portion. If the slot is of a predetermined width and at a predetermined location only a selected color component of a spectrum may be passed. As the spacing between the lines is changed, the deviation of all of the components of the spectrum varies. The deviation and the spread of the deviation of a particular primary color component having various wave lengths increase in magnitude with decreasing line to line spacing of the grating, and conversely both the deviation and the spread of deviation of a particular primary color component decreases with increasing line to line spacing. By spread of deviation is meant the angle included by a certain percentage variation in the wave length of a component of light.

In the kind of system under consideration an electron beam is modulated by a plurality of carrier waves of fixed and different frequency each corresponding to a respective color component, the amplitude of each of which is modulated in accordance with an electrical signal corresponding to the intensity of the respective color component to form a plurality of diffraction gratings having valleys extending in the same direction, each grating having a different line to line spacing corresponding to a respective primary color component and the valleys thereof having an amplitude varying in accordance with the intensity of the respective primary color component. If the primary color components selected are blue, green and red, and the carrier frequency associated with each of these colors is made proportionately lower, then the deviation in the first order spectrum of the blue component of white light by the blue diffraction grating, and similarly the deviation of the green component by the green diffraction grating, and the deviation of the red component by the red diffraction grating, can be made to correspond quite closely. Accordingly, a pair of transparent slots placed in the light mask in positions, relative to the undeviated path of light, corresponding to that deviation and of just sufficient orthogonal extent, pass all of the primary components. The intensity of the primary color components in the beam of light emerging from the mask would vary in accordance with the amplitude of a respective electrical signal corresponding to the respective color component. Projection of such a beam reconstitutes in color the image corresponding to the electrical signals.

It has been found that when two or more diffraction gratings of different spacing are formed in a light modulating medium having lines parallel in direction that all of the deviated light of the color components selected does not pass through the slots as indicated above but that considerable portions of the components are blocked by the light mask. It has been determined that when a pair of similarly oriented diffraction gratings are formed in a medium, inherently, at least another diffraction grating is formed in which the spacing between successive lines corresponds to a frequency which is the difference of the frequency of the other two gratings. The line to line spacing of such a grating, referred to as the beat frequency grating, is greater than the spacing of either of the other gratings, and accordingly the primary components of light incident thereon are deviated less than it is by the other two gratings. Thus first order light is diffracted less than desired and is blocked by the light mask having the transparency indicated above. Such blockage affects the proper reconstitution of the image in color and reduces the efficiency of the system.

Accordingly, an object of the present invention is to provide an improved simultaneous color projection system.

Another object of the present invention is to provide a simultaneous color projection system of improved efficiency over prior art systems.

A further object of the present invention is to provide a simultaneous color projection system which faithfully renders at spatially coincident points the primary color components and their relative intensities in an image to be projected.

In carrying out the present invention in one embodiment thereof the grating spacing for each of two primary colors having parallel lines is selected such that the component having longer wave lengths has the shorter spacing and the frequencies corresponding to those spacings are approximately in direct relationship to the ratios of the dominant wave lengths of the two primary colors. A pair of apertures or slots on each side of the line of undeviated light are utilized arranged in parallel with respect to the lines of the gratings. The slots are of such a width and spaced such that the apertures adjacent to the path of undeviated light pass substantially all the light of both the long and short wave length components of light in the first order spectra produced by the beat frequency grating and first order light of the short wave length component produced by its grating and the other two slots pass first order light of the long wave length component and second order light of the short wave length component produced by their corresponding gratings. The beating of the diffraction grating corresponding to the third primary color component with the other grating is avoided by forming the light diffraction grating corresponding to this color component with lines orthogonal to the lines of the other two diffraction gratings corresponding to the other primary color components.

The novel features believed characteristic of the present invention are set forth in the appended claims. The invention itself, together with further objects and advantages thereof, may best be understood by the following description taken in connection with the accompanying drawings in which:

Figure 1:
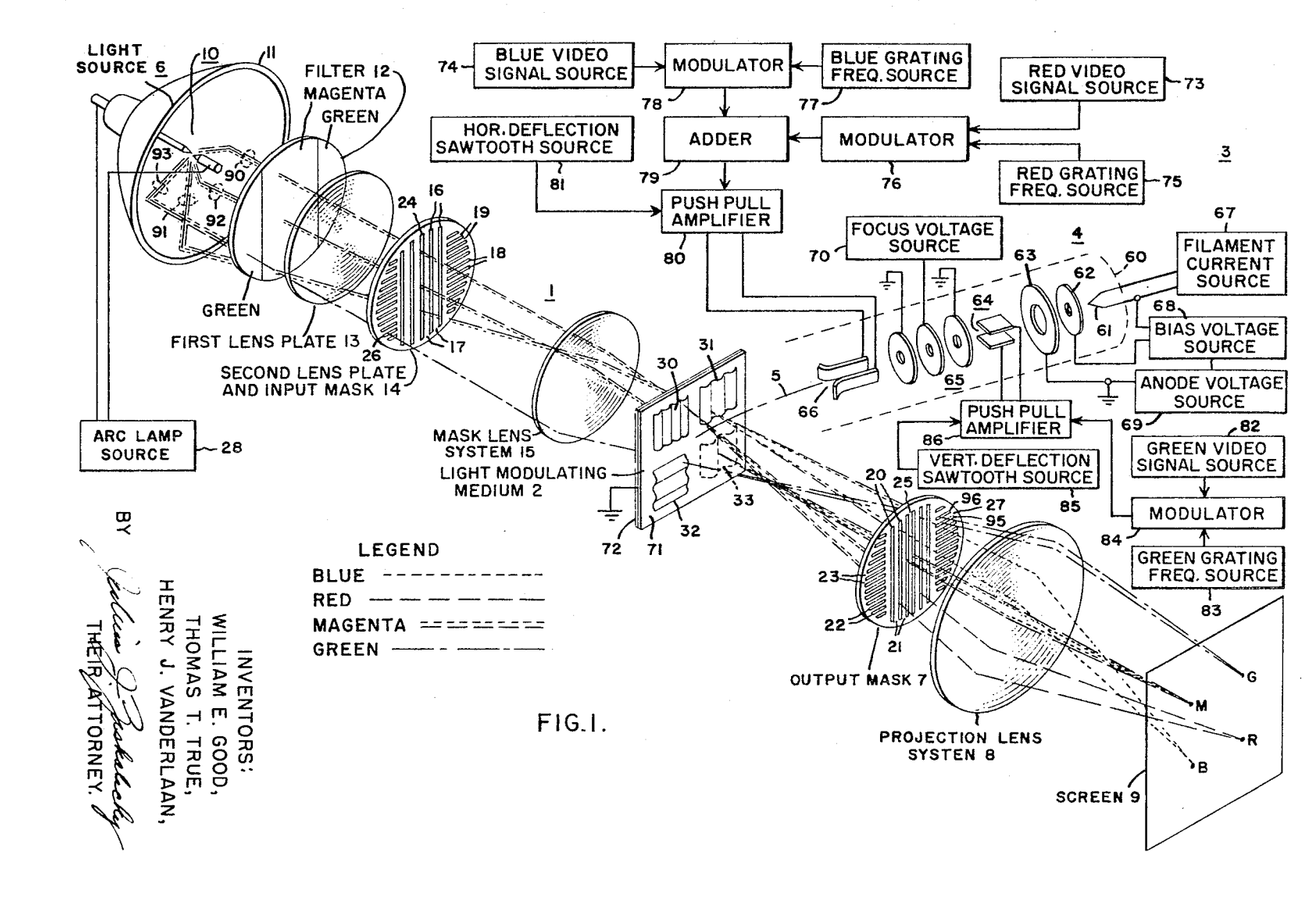
FIGURE 1 is a schematic diagram of a simultaneous color projection system embodying the present invention showing the light and electron channels thereof in perspective and the electrical circuits thereof in block form.

Referring now to FIGURE 1 there is shown a simultaneous color television projection system comprising an optical channel 1 including a light modulating medium 2 and an electrical channel 3 including an electron beam device 4, the electron beam 5 of which is coupled to the light modulating medium 2 in the optical channel. Light is applied from a source of light through a plurality of beam forming and modifying means onto the light modulating medium. In the electrical channel electrical signals varying in magnitude in accordance with the point by point variation in intensity of each of the three primary color constituents of an image to be projected are applied to the electron beam device to modulate the beam thereof, in the manner to be more fully described below, to produce deformations in the light modulating medium which modify the light transmitted by the transparent modulating medium in point by point correspondence with the image to be projected. An apertured light mask 7 and projection lens system 8, which may consist of a plurality of lens elements, on the light output side of the light modulating medium function to cooperate with the light modulating medium to control the light passed by the optical channel and also to project such light onto a screen 9, thereby reconstituting the light in the form of an image of the image to be projected.

On the input side of the light modulating medium 2 are located in order a source of light 6 consisting of a pair of electrodes 10 between which is produced white light by the application of a voltage therebetween from source 28, an elliptical reflector 11 with the electrodes 10 located at the adjacent focus thereof, a generally circular filter member 12 having a vertically oriented central portion adapted to pass substantially only the red and blue or magenta components of white light and having sectors on each side of the central portion adapted to pass substantially only the green component of white light, a first lens plate member 13 of generally circular outline which consists of a plurality of lenticules stacked in horizontal and vertical array, a second lens plate and input mask member 14 of generally circular outline also having a plurality of lenticules on one face thereof stacked in corresponding horizontal and vertical array, and the input mask of the other face thereof, and a mask imaging lens system 15 which may consist of a plurality of lens elements. In the light output portion of the optical channel are located an output mask member 7 and a projection lens system 8. The elliptical reflector 11 is located with respect to the light modulating medium 2 such that the latter appears at the other focus thereof. The central portion of the input mask includes a plurality of vertically extending transparent slots 16 between which are located a plurality of vertically extending opaque bars 17. On sectors of the mask on each side of the central portion of the mask are located a plurality of parallel horizontally oriented slots 18 or transparent light apertures spaced between similarly oriented parallel opaque bars 19. The first plate member 13 functions to effectively convert the single arc source 10 into a plurality of such sources corresponding in number to the number of lenticules on the lens plate member 13 and to image the arc source on individual separate elements of the transparent slots in the input mask plate 14. Each of the lenticules on the second lens plate 14 images a corresponding lenticule of the first lens plate member 13 onto the active area of the light modulating medium 2. With the arrangement described efficient utilization is made of light from the source 6 and also a uniform distribution is produced on the light modulating medium 2. The first plate member 13 and the second plate member 14 are shown as planar in form to simplify the illustration and description of the invention; however, it will be appreciated that both of these plates may be in the form of sectors of spherical shells convex with respect to the arc lamp source. The filter member 12 is constituted of the portions indicated such that red and blue light components from the source register on the vertically extending slots and green light from the source is registered on the horizontal slots of the input mask member 14.

The lens system 15 functions to image the light from the slots of the input mask member 14 through the light modulating medium 2 onto appropriate portions of the output mask member 7 which will be described in detail below. The output mask member 7 is shown as planar in form for simplicity in illustrating and describing the invention, and in actual practice may be curved in the form of a sector of a spherical shell, concave with respect to the rear of the system. The output mask member 7 has a plurality of parallel vertically extending transparent slots 20 separated by a plurality of parallel vertically extending opaque bars 21 in the vertical portion thereof. The output mask also has a plurality of parallel horizontally extending transparent slots 22 separated by a plurality of parallel horizontally extending opaque bars 23 in sectors on each side of the central portion thereof. In the absence of deformations in the light modulating medium 2, the mask lens system 15 images light from each of the slots on the input mask 14 onto corresponding opaque bar portions on the output mask 7, for example, light from the input slot 24 is imaged on the output bar 25. Similarly, light passing through the horizontal slot 26 on the input mask is imaged by the lens system 15 on the corresponding bar 27 on the output mask. When the light modulating medium 2 is deformed, light is deflected by the light modulating medium, passes through the slots in the output mask 7 and is projected by projection lens 8 on the screen 9. Further details on the input optics of an embodiment of the system of the present invention is covered in a copending patent application, Serial No. 316,606, filed October 16, 1963, assigned to the assignee of the present invention.

Phase diffraction gratings have the property of deviating light incident thereon, the angular extent of the deviation being a function of the line to line spacing of the grating and also of the wave length of light. For a particular wave length a large line to line spacing would produce less deviation than a small line to line spacing. Also for a particular line to line spacing short wave lengths of light are deviated less than long wave lengths of light. Phase diffraction gratings also have the property of transmitting deviated light in varying amplitude in response to the amplitude or depth of the lines or valleys of the grating. Accordingly it is seen that the phase diffraction grating is useful for the point by point control of the intensity of the color components in a beam of light. The line to line spacing of a grating controls the deviation, and hence color component selection, and the amplitude of the grating controls the intensity of such component. By the selection of the spacing of the blue and red grating, in a red, blue, and green primary system, for example, such that the spacing of the blue grating is sufficiently smaller in magnitude than the red grating so as to produce the same deviation in first order light as the deviation of the red component by the red grating, the deviation of the red and blue components can be made the same. Thus the red and blue components can be passed through the same apertures in an output mask and the relative magnitude of the red and blue light would vary in accordance with the amplitude of the gratings. Such a system is described and claimed in U.S. Patent No. Re. 25,169, W. E. Glenn, Jr., assigned to the same assignee as the present invention.

When a pair of phase diffraction gratings such as those described are simultaneously formed and superimposed in a light modulating medium, inherently another diffraction grating, referred to as the beat frequency grating, is formed which has a spacing greater than either of the other two gratings, if the beat frequency itself is lower than the frequency of either of the other two gratings. The effect of such a grating, as is apparent from the considerations outlined above, is to deviate red and blue light incident thereon less than is deviated by the other two gratings and hence to be blocked by the output mask having apertures set up on the basis of consideration outlined in the previous paragraph. Such blockage represents impairment of proper color rendition as well as loss of useful light. One way to avoid such effects in a two color component system is to provide diffraction gratings which have lines or valleys extending orthogonal to one another. Such an arrangement is disclosed and claimed in U.S. Patent 3,078,338, W. E. Glenn, Jr., assigned to the assignee of the present invention. However, when it is desired to provide three diffraction gratings superimposed on a light modulating medium for the purpose of modulating simultaneously point by point the relative intensity of each of three primary color components in a beam of light, inevitably two of the phase gratings must be formed in a manner to have lines or valleys, or components thereof, extending in the same direction. The present invention is directed to overcoming such problems in two and three primary color component systems.

On the light modulating medium 2 are shown in perspective considerably enlarged sections 30, 31, and 32 of the phase diffraction gratings for each of the respective primary color components, red, blue and green, and a section 33 of the beat frequency grating produced inherently by the simultaneous production of the red and blue gratings having lines extending in the same direction. In this figure the red and blue gratings which produce the beat frequency are not shown for reasons of clarity. These gratings were produced in response to a color television signal consisting of spacially separated red, blue, green and magenta spots. Such an array of spots will be useful in explaining the operation of the system from which an understanding of the principles of the present invention will be readily obtained.

According to present day monochrome and color television standards in force in the United States an image to be projected by a television system is scanned by a light-to-electrical signal converter horizontally at a rate of 525 lines every one-thirtieth of a second and vertically at a rate of one field of alternate lines every one-sixtieth of a second. Correspondingly, the electron beam of a light reproducing or controlling device is caused to move at horizontal scan frequency of 15,750 cycles per second in synchronism with the scanning of the light converter and to form thereby images of light varying in intensity in accordance with the brightness of the image to be projected. The pattern of scanning lines as well as the area of scan is commonly referred to as the raster.

Figure 2:
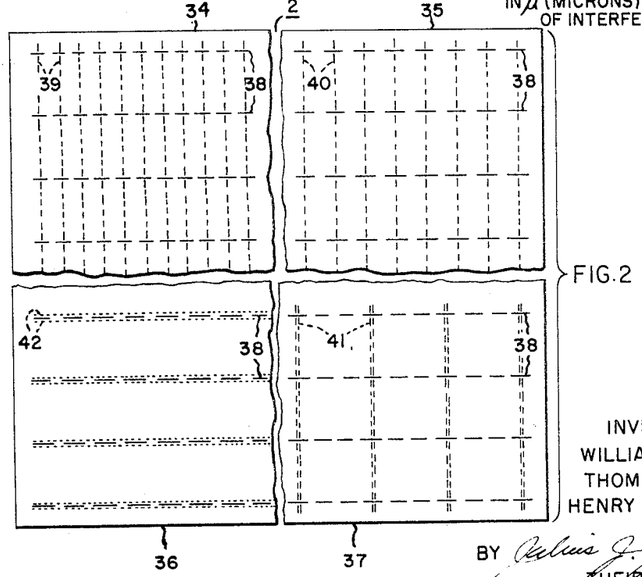
FIGURE 2 is a diagram of the light modulating medium fragmented into four sections to illustrate in diagrammatic form some of the parameters of the diffraction gratings formed thereon in accordance with the present invention.

In FIGURE 2 is shown such a raster in the light modulating medium which has been segmented into four sections 34, 35, 36, and 37 corresponding to the four portions of the light modulating medium on which gratings have been formed in accordance with the array of red, blue, green and magenta spots respectively, mentioned above. The size of the raster in the embodiment of FIGURES 1 and 2 is approximately three-fourths of an inch in height and one inch in width. The horizontal dash lines 38 are the alternate horizontal scanning lines of the raster appearing in one of the two fields of a frame. In section 34 of the raster shown in the upper left hand corner of FIGURE 2 the spaced vertically oriented dotted portions 39 on each of the raster lines schematically represent concentrations of charge laid down by an electron beam to form the red diffraction grating in a manner to be described hereinafter, such concentrations occurring at equally spaced intervals on each line. The corresponding parts of each scanning line have similar concentrations thereby forming a series of lines of charge equally spaced from adjacent lines which cause the formation of valleys in the light modulating medium, the depth of such valleys, of course, depending upon the concentration of charge. Such a grating is produced by superimposing on an electron beam moving horizontally at a frequency of 15,750 cycles per second a carrier wave, for example a sine wave of smaller amplitude but of fixed frequency of the order of a thousand times greater, i.e., of the order of 18 megacycles per second, thereby produces a grating line to line spacing approximately one thousandth of the width of the raster, i.e., approximately one mil (a mil is one-thousandth of an inch). The high frequency carrier wave causes a velocity modulation of the beam thereby causing the beam to move in steps and hence to lay down the pattern of charge depicted in this figure with each valley extending in the vertical direction and adjacent valleys being spaced apart by a distance determined by the carrier frequency.

In the upper right hand corner of FIGURE 2 is shown section 35 of the raster on which a blue diffraction grating has been formed. As in the case of the red diffraction grating the vertically oriented dotted portions 40 on each of the beam scan lines represent concentrations of charges laid down by the electron beam. The grating line to line spacing is uniform and the amplitude thereof varies in accordance with the amount of charge present. The blue grating is formed in a manner similar to the formation of the red grating, i.e., a carrier frequency wave of amplitude smaller than the horizontal deflection wave is applied to produce a velocity modulating in the horizontal direction of the electron beam at that frequency rate thereby to lay down charges on each line that are uniformly spaced with the line to line spacing being a function of the frequency. A suitable frequency for the blue grating is 13.5 megacycles per second. For such a frequency the line to line spacing of the blue grating would be approximately 1.4 mils.

On the section 37 of the raster in the lower right hand corner of FIGURE 2 are shown the horizontal scanning lines on each of which are located pairs of dotted portions 41 spaced at regular intervals along each scanning line with corresponding parts of each scanning line schematically representing locations at which deposits of electron charge occur to form vertical lines of charge representing the magenta grating. This grating is inherently produced by the production of red and blue diffraction gratings on the same portion of the raster. As mentioned above, on the assumption that the red grating has a line to line spacing of one mil and the blue grating has a line to line spacing of approximately 1.4 mils, the beat frequency grating occurring where deposits of charge coincide would be somewhat greater than either of these spacings, in particular, of the order of 4 mils.

In the lower left hand corner of FIGURE 2 is shown section 36 on which the green diffraction grating has been formed. In this part of the figure are shown the alternate scanning lines of a frame, or adjacent lines of a field. On each side of each of the scanning lines are shown a dotted line 42 schematically representing concentrations of charge extending in the direction of the scanning lines to form a diffraction grating having lines or valleys extending in a horizontal direction and having a spacing equal to the spacing between alternate lines of a frame. Such spacing in relation to the spacing of the vertically oriented diffraction gratings corresponds to a frequency of approximately 7 megacycles per second, i.e., approximately 3 mils. The green diffraction grating is controlled by modulating the electron scanning beam at a very high frequency in the vertical direction to produce a uniform spreading out or smearing of the electron charge transverse to the scanning direction of the beam, the amplitude of the smear in such direction varying proportionally with the amplitude of the high frequency carrier signal, which carrier signal varies inversely with the amplitude of the color signal. The frequency chosen is considerably higher than either the red or blue frequency to avoid undesired interaction between it and signals of other frequencies of the system including the video frequencies and the red and blue grating frequencies in various forms. With low modulation of the carrier wave more charge is concentrated in a line along the center of the scanning direction than with high modulation thereby to produce a greater deformation in the light modulating medium at that part of the line. In short, the natural grating formed by the focussed beam represents maximum green modulation or light field and the defocussing of the beam by the high frequency modulation deteriorates such grating in accordance with the amplitude of such modulation. For good dark fields the grating is virtually wiped out.

Thus FIGURE 2 depicts the manner in which a single electron beam scanning a raster area in the horizontal direction at spaced vertical intervals may be simultaneously modulated in velocity in the horizontal direction by two amplitude modulated carrier waves, both substantially higher in frequency than the scanning frequency, one substantially higher than the other, to produce a pair of superimposed vertically extending phase diffraction gratings of fixed spacing thereon, and also may be modulated in the vertical direction by an amplitude modulated carrier wave to produce a third grating having lines of fixed line to line spacing extending in the horizontal direction orthogonal to the direction of grating lines of the other two gratings. By amplitude modulating the three beam modulating signals corresponding point by point variations in the depth of the valleys or lines of the diffraction grating are produced. Thus by applying the three signals indicated, each simultaneously varying in amplitude in accordance with the intensities of a respective primary color component of the image to be projected, three primary diffraction gratings are formed the point by point amplitudes of which vary with the intensity of a respective color component.

As used in this specification with reference to the specific raster area of the light modulating medium, a point represents an area of the order of several square miles and corresponds to a picture element. For the faithful reproduction or rendition of a color picture element three characteristics of light in respect to the element need to be reproduced, luminance, hue, and saturation. Luminance is brightness, hue is color, and saturation is fullness of the color. It has been found that in general in a system such as the kind under consideration herein that one grating line is adequate to function for proper control of the luminance characteristic of a picture element in the projected image and that about three to four lines are a minimum for the proper control of hue and saturation characteristics of a picture element.

Figure 3:
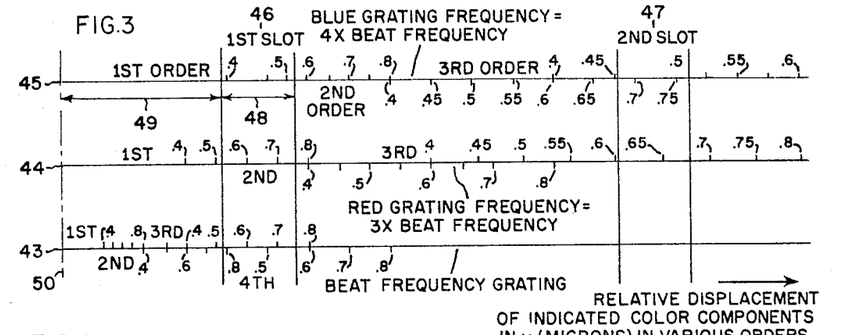
FIGURES 3 and 4 are diagrams useful in explaining aspects of the invention.
Figure 4:
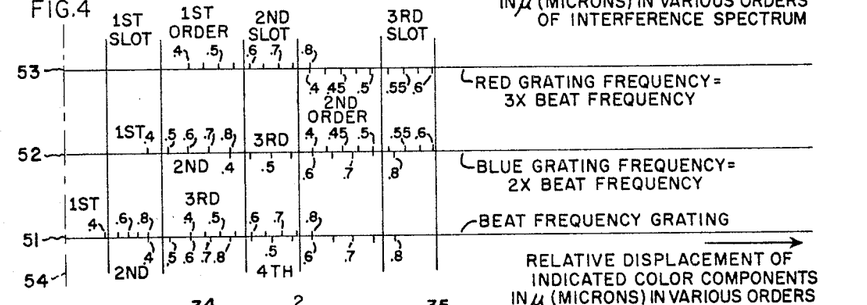

The manner in which the vertical slots 20 on the output mask are proportioned and aligned in accordance with the present invention with respect to the vertically directed gratings will be explained in connection with FIGURES 3 and 4 to which reference is now made. In FIGURE 3 are shown three coordinates extending horizontally, on each of which is represented the relative displacement of the indicated color components (the wavelengths of which are indicated in microns) in the various orders of the interference or diffraction spectra for the various carrier frequencies indicated (a micron is one millionth of a meter). The spectra on the lower coordinate 43 are produced by a grating having a spacing corresponding to a certain fundamental frequency referred to as the beat frequency. The spectra on the middle coordinate 44 are produced by a grating having a spacing corresponding to a frequency three times the fundamental frequency. The spectra on the upper coordinate 45 are produced by a grating having a spacing corresponding to a carrier frequency of four times the fundamental frequency. If the grating corresponding to the upper coordinate is the blue grating and the grating corresponding to the middle coordinate is the red grating, the slots denoted first and second having widths and spacings shown in this figure would function to pass first order red and blue light.

With the first slot of width 48 and a spacing 49 from the direction of maximum intensity of zero order of light or the direction of undeviated light represented by line 50, light from a corresponding first slot on the input mask and deviated by the blue diffraction in the first order spectrum having wave lengths falling in the range of approximately .4 to .5 of a micron would pass through the first slot. Similarly, light deviated by the red diffraction having wave lengths falling in the range of .52 and .76 of a micron would also pass through the first slot. The second slot of the same width as the first slot is spaced from the first slot to pass the first orders of diffracted light from a second input slot on the input mask. The output slots of which only two in number are shown are spaced to avoid passing the zero order of light. Very little energy is deviated in spectral orders other than the first and second. With the arrangement of red and blue gratings indicated it should be observed that the beat frequency grating inherently formed by the simultaneous presence of the red and blue grating corresponds to the fundamental frequency represented by the lower coordinate and that all first order light and substantially all of second order light would be blocked by the output mask. The present invention is directed to taking advantage of the existence of the beat frequency grating to leave relatively unimpaired the efficiency of the system and also to permit rendition in time and spatially coincident points of the primary colors of an image in their true composition and relative intensities.

The arrangement of the parts of the system and their mode of operation to achieve these highly desirable and advantageous results in accordance with the present invention is illustrated and described in connection with FIGURE 4. In this figure, as in FIGURE 2, extending along the horizontal are three coordinates 51, 52 and 53 each representing along its axis the displacements orthogonal to the direction represented by line 54 of undiffracted light of the various wave lengths for diffraction grating spacings corresponding, respectively, to a fundamental frequency, a frequency twice the fundamental frequency and a frequency three times the fundamental frequency. The carrier frequency for the red grating is now selected to be higher than the carrier frequency of the blue grating and corresponds to three times the fundamental frequency. The blue grating carrier frequency is selected to be twice the fundamental frequency. In this arrangement both first and second orders of light of the desired primary colors of red and blue are utilized and a pair of slots on each side of the zero orders of spectra are utilized. The first slot on one side is arranged in width and location to pass all of the first order light of the red and blue components and some of the second order light of the blue component from the beat frequency grating, and in addition part of the first order blue diffracted by the blue grating. The second slot on the one side is arranged in width and location to pass first order red light and the second order blue light diffracted, respectively, by the red and blue gratings. With two such slots of predetermined width and spacing from the zero order direction substantially all of the first and second order light of the red and blue components is passed for projection of red and blue components or combinations thereof. This system not only utilizes first order light but passes second order light, which while less in magnitude than first order light is substantial, thereby providing at least as great if not greater efficiency than prior systems and at the same time improving the fidelity of color rendition of the system. In essence such results are achieved by passing the desired red and blue light diffracted by the beat grating.

An electron writing system is provided for producing the phase diffraction gratings in the light modulating medium and comprises an evacuated enclosure 60 in which are included a filamentary cathode 61, a control electrode 62, a first anode electrode 63, a pair of vertical deflection plates 64, a set of focussing electrodes 65, a pair of horizontal deflection plates 66 and the light modulating medium 2. The filament current source 67 connected to the filamentary cathode, the bias voltage source 68 connected between the cathode and the control electrode, and the first anode voltage source 69 connected between the first anode and the cathode and control electrode produce in the evacuated enclosure an electron beam 5 that at the point of focussing is of small cross sectional dimensions (a fraction of a mil) and of low current (a few micro-amperes) and high voltage. The first anode 63 is maintained at ground potential and the cathode 61 and control electrode 62 are at very large negative potentials of the order of several thousand volts. The focussing electrodes 65 function to control the focus of the electron beam in the light modulating medium in response to voltage from focus voltage source 70.

A pair of carrier waves which produce the red and blue gratings, in addition to the horizontal deflection voltage, are applied to the horizontal deflection plates 66. The electron beam, as previously mentioned, is deflected in steps separated by distances on the light modulating medium which are a function of the grating spacing of the desired red and blue diffraction gratings. The period of hesitation at each step is a function of the amplitude of the applied signals corresponding to the red and blue video signals. A high frequency carrier wave modulated by the green video signal, in addition to the vertical sweep voltage, is applied to the vertical deflection plates to spread the beam out in accordance with the amplitude of the green video signal as explained above.

The light modulating medium 2 is an oil 71 of appropriate viscosity and charge decay characteristics on a transparent support member 72 coated with a transparent conductive layer adjacent the oil, such as indium oxide. The conductive layer is maintained at ground potential and constitutes the target electrode for the electron writing system.

Of course, in accordance with television practice, the control electrode 62 is also energized after each horizontal and vertical scan of the electron beam by a blanking signal obtained from a conventional blanking circuit (not shown). The electron writing system shown and described, and also the horizontal and vertical deflection circuits shown and to be described below are shown and described in more detail in U.S. Patent 3,078,388, W. E. Glenn, Jr., mentioned above.

Above the electron gun assembly are shown in functional blocks the sources of the horizontal deflection and beam modulating voltages which are applied to the horizontal deflection plates to produce the desired horizontal deflection. This portion of the system comprises a source 73 of red video signal and a source 74 of blue video signal each corresponding, respectively, to the intensity of the respective primary color component in a television image to be projected. The red video signal and a carrier wave from the red grating frequency source 75 are applied to a modulator 76 which produces an output in which the carrier wave is modulated by the red video signal. Similarly, the blue video signal and a carrier wave from the blue grating frequency source 77 is applied to modulator 78 which develops an output in which the blue video signal amplitude modulates the carrier wave. Each of the amplitude modulated red and blue video carriers are applied to an adder 79 in series with the output of the normal horizontal deflection push pull amplifier 80 to which is applied the output of a horizontal deflection signal source 81.

Below the electron gun assembly are shown in block form the circuits which function to apply vertical deflection and beam modulation voltages to the vertical deflection plates to produce the desired vertical deflection. This portion of the system comprises a source 82 of green video signal, a green grating frequency source 83 providing a source of high frequency carrier energy and a modulator 84 to which the green video and carrier signal are applied. An output wave is obtained from the modulator having a carrier frequency equal to the carrier frequency of the green grating frequency source 83 and an amplitude varying in accordance with the amplitude of the green video signal. The modulated carrier wave and the output from the vertical deflection source 85 are applied to the conventional push pull amplifier 86 to cause deflection of the electron beam in the manner previously indicated.

The electrical conductivity of the right modulating medium 2 is constituted so that the amplitude of the diffraction gratings decay to a small value after each field of scan thereby permitting alternate variations in amplitude of the diffraction gratings at the 60 cycle field scanning rate. While the light modulating medium has been shown with the support member 72 thereof facing the light source it will be appreciated that the opposite surface on which the electron beam writes could equally as well be placed facing the light source. In physical size the active area or raster of the light modulating medium may be in the order of three-fourths of an inch high and one inch wide. The viscosity and other properties of the light modulating medium are selected such that the deposited charge produces the desired deformations in the surface.

The operation of the system in accordance with the present invention will be readily understood by considering the manner in which the system functions, in response to video signals corresponding to an image of spaced spots of red, blue, green and magenta colors, the magenta color being constituted of red and blue components, to project such an image on a screen. It will be appreciated that the spatially separated spots of the primary color components red, blue and green could be made spacially coincident thereby making it readily apparent the manner in which the system functions to control the color constitution point by point in accordance with the corresponding variation in the color constitution in the image being projected.

In FIGURE 1 it will be appreciated that the light modulating medium 2 is shown enlarged in lateral and vertical extent, as well as in thickness, for reasons of clarity of illustration. Scanning of the light modulating medium by the electron writing system in response to the horizontal and vertical deflection signals and to the carrier waves modulated by blue, red and green video signals produces diffraction gratings in four spacially separated locations on the light modulating medium corresponding to the location in the image where the red, blue, green and magenta spots appear. As the amplitude of the signal representing red, green, blue and magenta colors over the other portions of the raster is zero the gratings over these areas are of zero amplitude, i.e., non existent. The gratings are also shown enlarged for reasons of clarity in illustration. The magenta grating 33 is shown dotted and only the beat frequency grating of the composite red and blue grating is shown in this location for purposes of illustrating the manner in which the invention advantageously utilizes the existence of the beat frequency grating.

Consider the manner in which the light from the source is modified by the diffraction gratings to produce a projected image of the aforementioned image of four spots. For this purpose the modification in the constitution of four bundles of rays originating from the light source 6 and passing through the various optical components of the system from the source 6 to the screen 9 will be traced. Each of the four bundles of rays has a red, blue and green component. It will be appreciated that many such bundles of rays fall on a point of the light modulating medium corresponding to a picture element of the image to be projected and that many such groups of bundles make up a beam of light. A beam as used in this specification signifies light of spacial extent embracing substantially all or a significant portion of the active area of the light modulating medium. The red component in the bundles of rays is indicated by long dash lines, the blue component is indicated by short dash lines and the green is indicated by alternate long and short dash lines. The first bundle 90 of rays from the source passes through the magenta, or red and blue, filter 12 which passes the red and blue rays and reflects the green rays. The red and blue rays are imaged by the lens plates 13 and 14 to pass through the slot 24 in the input mask and impinge on the red diffraction grating 30. The red diffraction grating deviates the red and blue rays orthogonal or horizontally on the output mask 7. In the absence of a red diffraction grating light would have fallen on the bar 25 denoted the zero order bar for the beam arrangement under consideration. The presence of the red grating deviates the red and blue rays incident thereon such that the red rays pass through the second slots from the opaque bar 25 and the blue light being of shorter wave length is deflected less and falls on the bar between the first and second slot (see upper coordinate of FIGURE 4). Thus red light is passed by the output mask and is imaged by the projection lens 8 on the dot area designated R on the projection screen 9. The intensity of the red image, of course, varies in accordance with the amplitude of the red grating.

Consider now the manner in which the blue dot is formed in the projected image. The second bundle 91 of rays from the light source passes through the magenta filter which eliminates the green component and allows the red and blue components to pass through. The red and blue rays are imaged by the lens plates to pass through slot 24 in the input mask and impinge on the blue diffraction grating 31. The blue diffraction grating deviates the red and blue rays orthogonally or horizontally on the output mask. In the absence of a blue diffraction grating appearing at that location in the light modulating medium light would have fallen on bar 25 on the output mask. As the blue diffraction grating has a larger line to line spacing than the red diffraction grating, both red and blue rays are deflected or deviated less than they would be if they had fallen on a red diffraction grating. However, the blue component is diffracted or deviated less. Accordingly, the second order spectrum of the blue component is passed by the second slot from the zero order bar 25, and the red component (both first and second order spectrum) is blocked. Also, a substantial part of the first order spectrum of the blue component (not shown for reasons of clarity) is passed by the first slot from the zero order bar 25. See middle coordinate in FIGURE 4. The blue light passed by the light mask is then imaged by projection lens 8 onto the area designated B on the projection screen 9. The intensity of the blue image varies in accordance with the amplitude of the blue diffraction grating.

When blue and red gratings are superimposed on the same area corresponding to the appearance of red and blue color components in that area of the image, at least another diffraction grating inherently is formed. It has been referred to as the beat frequency diffraction grating. The line to line spacing of this grating is larger than the sum of the spacings of the red and blue diffraction gratings in the present example. The manner in which the system according to the present invention enables advantage to be taken of such grating will be illustrated by considering the manner in which a magenta spot i.e., a spot consisting of red and blue components, is projected. On the light modulating medium the magenta grating 33 is shown dotted. For reasons of clarity the red and blue diffraction gratings are not shown but it is to be understood that the manner in which the red and blue gratings cooperate with the slots to produce the separate red and blue color rendition is the same as described in connection with the formation of red and blue dots and in addition the magenta grating operates on bundles of rays containing only red and blue components to pass these components as desired rather than blocking them as in prior art systems.

The third bundle 92 of rays from the light source upon passing through the magenta filter contain only the red and blue rays. The lens plate 13 images the bundle through slot 24 onto the magenta grating area of the light modulating medium. The lens plate 14 images the bundle onto corresponding bar 25 in the absence of modulation in the light modulating medium. The presence of modulation causes an orthogonal deflection of the red and blue rays. As the spacing of the magenta grating 33 is substantially greater than either red or blue gratings the deviation produced in the red and blue rays is less in angular extent and also in angular spread. In accordance with the bar and slot system of the present invention the first slot on each side of the zero order bar 25 passes the red and blue light (first order light). See lower coordinate in FIGURE 4. This light is then imaged by the projection lens 8 onto the corresponding location designated M on the screen 9. It will be appreciated that the amplitude of the red and blue components varies in accordance with the amplitude of the grating.

The fourth bundle 93 of rays of red, blue and green light on passing though the green filter contains only the green component. These rays are imaged by the lens plates 12 and 14 through a horizontal slot 26 onto the portion of the light modulating medium having the green diffraction gratings formed thereon. In the absence of a diffraction grating in the light modulating medium the lens would image the green rays onto bar 27 on the output mask. The presence of the horizontally oriented green diffraction grating 32 causes a deviation in the vertical direction of the light incident on the diffraction grating so that it passes through the slots 95 and 96 in the output bar. The deviated light is imaged by the lens onto corresponding area designated G of the screen. Thus from the manner in which each of three individually formed diffraction gratings functions individually in a light modulating medium in conjunction with slots or apertures appropriately dimensioned and oriented to pass light varying in accordance with the amplitude of the valleys of a respective diffraction grating, it is readily apparent that were the diffraction gratings to be formed simultaneously in the same area of the light modulating medium corresponding to the existence simultaneously of various color components of an image to be projected, that the system of the present invention would pass each of the three color components onto the projection screen in relative proportion to the intensity of the respective color component.

A further understanding of the operation of the system and of the invention will be obtained from a consideration of the manner in which the lens plates 13 and 14 in the input portion of the optical channel function to form a plurality of beams from a simple source. The input portion of the optical channel including the lenticular lens plates are shown described in the aforementioned copending application (Serial No. 316,606) assigned to the assignee of the present invention. A lenticule on lens plate 13 images light from the electrodes 10 onto a corresponding lenticule on plate 14. The lenticule on plate 14 images the lenticules on plate 13 onto the active area of the light modulating medium. Pairs of lenticules, one from each plate thus form a plurality of beams from the light source, each beam passing through a respective element of a slot in the input mask and imaged onto the active area of the light modulating medium. Each beam is imaged by the lens system through the light modulating medium, in the absence of modulation therein, on a respective element or portion on a corresponding bar on the output mask. It should be noted that the pairs of lenticules and the beam fall into two groups, a red and blue, or magenta group, and a green group. Accordingly, the formation of any one of the three primary color diffraction gratings anywhere in the active area of the light modulating medium will deviate the primary components of light sufficiently to pass the light through a portion of adjacent slots, as explained above. In the case of the red and blue beam a pair of slots in the output mask on each side of the zero order bar is utilized. Such light will vary in intensity in accordance with the amplitude of the grating and will be imaged by the lens system onto locations on the screen corresponding to the locations of that portion of the grating on the light modulating medium.

It has been mentioned above in this system that portions of two slots immediately adjacent to a zero order bar on each side thereof are used in connection with the passing of red and blue light. Also second order red and blue light is utilized in addition to first order red and blue light. In the arrangement described a plurality of beams are imaged on the raster and utilized for the projection of the image. It is apparent that the identical part of each slot may be used as many as four times in connection with four different red and blue beams. Thus with an arrangement of the red and blue pairs of lenticules in horizontal rows and in vertical columns a plurality of horizontally and vertically aligned beams are formed. Adjacent horizontal aligned beams would make use of some of the elements of the same slots. Adjacent vertically aligned beams would make use of adjacent elements of the same slots. While in the system there are shown for the red and blue beams five input slots imaging on five output bars separated by six slots, it is appreciated that, if desired, the number of input slots and corresponding number of output slots could be changed if desired. Similarly with the arrangement of the green pairs of lenticules in horizontal rows and in vertical columns a plurality of horizontally and vertically aligned beams are formed. A single pair of slots are associated with each such beam and the slots are vertically spaced. Accordingly, the green slots would be interleaved in function in the vertical direction as the red and blue slots are interleaved in the horizontal direction. In view of the multiple use of the bars and slots it is advantageous to make the vertically extending slots in a particular beam system on each side of the zero order bar of substantially equal width and to substantially equally space the slots along the orthogonal direction of the grating. With a single arc lamp source and without special input optics the vertical slots used were approximately 30% of the distance from one edge of a slot to the corresponding edge of an adjacent slot. With the input optics described above and covered in detail in the aforementioned patent application Serial No. 316,606 narrow beams can be produced. Such narrow beams require less corresponding output bar width to block their passage under zero modulation conditions. Accordingly, the slot width in relation to the sum of an output slot and bar widths may be as high as sixty to seventy-five percent, as desired. While twelve horizontally oriented slots are shown in each of the segments of the input mask and thirteen horizontally oriented slots are shown in the corresponding segments in the output mask, it will be appreciated that, if desired, the number of such input slots and corresponding number of output slots could be changed. Conveniently the horizontally extending slots are substantially equally spaced and each is approximately one-half the extent of a bar.

The invention has been described in connection with an additive primary color system in which the primary colors are red, blue and green. It will be readily understood that the present invention is equally useful in connection with such a primary color system in which other pairs of colors than red and blue are identified with vertically extending gratings, for example red and green, and green and blue, and also in connection with other primary color systems, for example, subtractive systems, provided, of course, the grating frequencies, the wave lengths of the color components, the slot arrangement are related in accordance with the principles of the invention. While the invention has been described in connection with a system in which the modulating medium controls the transmission of light, it is equally applicable to systems in which the modulating medium controls the reflection of light.

It will be appreciated that the invention is equally applicable to light valve projection systems making use of diffraction gratings whether they are produced by deformations in a medium or by other means. It will also be appreciated that in the system described involving the primary color components of red, blue, and green in which the red and blue gratings were similarly oriented and in connection with which a ratio three to two of the red to the blue carrier frequency was utilized, the ratio being substantially in inverse relationship to the ratio of the wave length of the dominant components of light of these colors utilized in the system, that other ratios of red to blue carrier frequencies, for example, seven to four, and four to three, may be utilized, particularly if advantageous in the particular system employed. In addition, it will be appreciated that when other pairs of colors are associated with a pair of gratings having similarly directed lines that correspondingly different ratios would have to be utilized in conformance with the inverse relationship of the wave lengths of those two colors in accordance with the principles of the invention.

While the invention has been described in respect to specific embodiments, it will be appreciated that many modifications and changes may be made by those skilled in the art, and we intend by the appended claims to cover all such modifications and changes as fall within the true spirit and scope of our invention.

What we claim as new and desire to secure by Letters Patent of the United States is:

1. The combination in a light diffraction system of a transparent light modulating medium formable into diffraction gratings by electric charges deposited thereon, means to direct an electron beam upon said medium to produce such electric charges in said medium, means to deflect said beam in one direction at successively spaced distances over said medium to form a raster thereon, means for modulating said beam with a signal of a fixed frequency corresponding to the one of a pair of primary color components of a color image having the longer wave lengths and an amplitude varying in accordance with the point to point intensity of said color component in said image to form in said medium a diffraction grating, the spacing between adjacent lines thereof being dependent on said frequency, means for simultaneously modulating said beam with another signal of another fixed frequency lower than said one fixed frequency corresponding to said other primary color component of said color image and amplitude varying in accordance with the point to point intensity of said other color component in said image to form in said medium another diffraction grating having lines oriented parallel to the lines of said one grating, the spacing between adjacent lines of said other grating being dependent upon said other frequency, said diffraction gratings forming in said medium a third diffraction grating the spacing between adjacent lines of which correspond to a frequency which is the difference of said fixed frequencies, said difference being less than either of said fixed frequencies, said gratings diffracting light in a direction orthogonal to the lines thereof, a mask having an opaque portion and a transparent portion, said transparent portion having an extent in said orthogonal direction and so positioned as to pass first order light of said one color component and second order light of said other color component therethrough, said mask having another transparent portion spaced in said orthogonal direction on said mask so as to pass all of the first order light of said two color components diffracted by said third diffraction grating and to pass first order light of said other color component diffracted by said other grating.

2. The combination in a light diffraction system of a transparent light diffracting medium deformable by electric charges placed thereon, means to direct an electron beam upon said medium to produce such electric charges in said medium, means to deflect said beam in one direction at successively spaced distances over said medium to form a raster thereon, means for modulating said beam with a signal of a fixed frequency corresponding to the one of a pair of primary color components of a color image having the longer wave lengths and an amplitude varying in accordance with the point to point intensity of said color component in said image to form in said medium a diffraction grating, the spacing between adjacent lines thereof being dependent on said frequency and the depth of said lines being dependent upon the amplitude of said signal, means for simultaneously modulating said beam with another signal of another fixed frequency lower than said one fixed frequency corresponding to said other primary color component of said color image and amplitude varying in accordance with the point to point intensity of said other color component in said image to form in said medium another diffraction grating having lines oriented parallel to the lines of said one grating, the spacing between adjacent lines of said other grating being dependent upon said other frequency and the depth of said lines being dependent on the amplitude of said other signal, said diffraction gratings forming in said medium a third diffraction grating the spacing between adjacent lines of which correspond to a frequency which is the difference of said fixed frequencies, said difference being less than either of said fixed frequencies, said gratings diffracting light in a direction orthogonal to the lines thereof, a mask having an opaque portion and a transparent portion, said transparent portion having an extent in said orthogonal direction and so positioned as to pass first order light of said one color component and second order light of said other color component therethrough, said mask having another transparent portion spaced in said orthogonal direction on said mask so as to pass all of the first order light of said two color components diffracted by said third diffraction grating and to pass first order light of said other color component diffracted by said other grating.

3. A system for simultaneously controlling point by point the intensity of each of a pair of color components in a beam of light in response to respective electrical signals comprising a light modulating medium, means for directing said beam on said light modulating medium, means for simultaneously producing two sets of deformations in said medium the deformations in each set being arranged in uniformly spaced similarly directed lines to form respective light diffraction gratings, the lines in each set extending in the same direction, one of said diffraction gratings having a line to line spacing smaller than the other of said gratings, said sets of gratings forming a third diffraction grating of line to line spacing which is uniform and greater than the line to line spacing of either of said other gratings, means for controlling the amplitude of the lines of deformation of said one grating in response to the one of said electrical signals corresponding to the one of said color components of longer wave lengths, means for controlling the amplitude of lines of deformation of the other of said gratings in response to the other of said electrical signals, a light mask positioned in the path of light transmitted from said medium, said mask having a pair of transparent portions, each of said portions being displaced in position from the path of undeviated light from said medium, one of said portions positioned and of lateral extent to pass substantially first order light of said one color component diffracted by said one grating and second order light of said other color component diffracted by said other grating, the other of said transparent portions being positioned and of lateral extent to pass substantially all first order light of said components diffracted by said third grating and to pass first order light of said other color component diffracted by said other grating.

4. A system for simultaneously controlling point by point the intensity of each of a pair of color components in a beam of light in response to respective electrical signals comprising a light modulating medium, means for directing said beam on said light modulating medium, means for simultaneously producing two sets of deformations in said medium, the deformations in each set being arranged in uniformly spaced similarly directed lines to form respective light diffraction gratings, the lines in each set extending in the same direction, one of said diffraction gratings having a line to line spacing smaller than the other of said gratings and corresponding to the color component of longer wave lengths, the ratio of line to line spacing of said one grating to said other grating being substantially equal to the ratio of the dominant wave length of said shorter wave length color component to the dominant wave length of said longer wave length color component, said sets of gratings forming a third diffraction grating of line to line spacing which is uniform and greater than the line to line spacing of either of said one and other gratings, means for controlling the amplitude of the lines of deformation of said one grating in response to the one of said electrical signals corresponding to the one of said color components of longer wave lengths, means for controlling the amplitude of lines of deformation of the other of said gratings in response to the other of said electrical signals, a light mask positioned in the path of light transmitted from said medium, said mask having a pair of transparent portions, each of said portions being displaced in position from the path of undeviated light from said medium, one of said portions positioned and of lateral extent to pass substantially first order light of the color components of longer wave length diffracted by said one grating and second order light of the component having the shorter wave length diffracted by said other grating, the other of said transparent portions being positioned and of lateral extent to pass substantially all first order light of said components diffracted by said third grating and to pass first order light of said other component diffracted by said other grating.

5. A system for simultaneously controlling point by point the intensity of each of a pair of color components in a beam of light in response to respective electrical signals comprising a light modulating medium, means for directing said beam on said light modulating medium, means for simultaneously producing two sets of deformations in said medium, the deformations in each set being arranged in uniformly spaced lines to form respective light diffraction gratings, the lines in each set extending in the same direction, one of said diffraction gratings havings a line to line spacing smaller than the other of said gratings, said sets of gratings having similarly directed lines forming a third diffraction grating of line to line spacing which is uniform and greater than the line to line spacing of either of said one and other gratings, means for controlling the amplitude of the lines of deformation of said one grating in response to the one of said electrical signals corresponding to the one of said color components of longer wave lengths, means for controlling the amplitude of lines of deformation of the other of said gratings in response to the other of said electrical signals, a light mask positioned in the path of light transmitted from said medium, said mask having a pair of transparent portions, each of said portions being displaced in position from the path of undeviated light from said medium, one of said portions positioned and of lateral extent to pass substantially first order light of said one color component diffracted by said one grating and second order light of said other color component diffracted by said other grating, the other of said transparent portions being positioned and of the same lateral extent as said one portion to pass substantially all first order light of said components diffracted by said third grating and to pass first order light of said other component diffracted by said other grating.

6. A system for simultaneously controlling point by point the intensity of each of a pair of primary color components consisting of red and blue in a beam of light in response to respective electrical signals comprising a light modulating medium, means for directing said beam on said light modulating medium, means for simultaneously producing two sets of deformations in said medium, the deformations in each set being arranged in uniformly spaced lines to form respective light diffracting gratings, the lines in each set extending in the same direction, one of said diffraction gratings having a line to line spacing smaller than the other of said gratings, said sets of gratings forming a third diffraction grating of line to line spacing which is uniform and greater than the line to line spacing of either of said one and other gratings, means for controlling the amplitude of the lines of deformation of said one grating in response to the one of said electrical signals corresponding to the red color component, means for controlling the amplitude of lines of deformation of the other of said gratings in response to the other of said electrical signals, a light mask positioned in the path of light transmitted from said medium, said mask having a pair of transparent portions, each of said portions being displaced in position from the path of undeviated light from said medium, one of said portions positioned and of lateral extent to pass substantially first order light of the red color component diffracted by said one grating and second order light of the blue color component diffracted by other grating, the other of said transparent portions being positioned and of lateral extent to pass substantially all first order light of said color components diffracted by said third grating and to pass first order light of said blue color component diffracted by said other grating, the line to line spacing of said one grating with respect to the line to line spacing of said other grating being substantially in the relation of the center wave length of the blue color component to the center wave length of the red color component.

7. A system for simultaneously controlling point by point the intensity of each of a pair of color components in a beam of light in response to respective electrical signals comprising a light modulating medium, means for directing said beam on said light modulating medium, means for simultaneously producing two sets of deformations in said medium, the deformations in each set being arranged in uniformly spaced lines to form respective light diffracting gratings, the lines in each set extending in the same direction, one of said diffraction gratings having a line to line spacing smaller than the other of said gratings, said sets of gratings having similarly directed lines forming a third diffraction grating of line to line spacing which is uniform and greater than the line to line spacing of either of said one and other gratings, means for controlling the amplitude of the lines of deformations of said one grating in response to the one of said electrical signals corresponding to the one of said color components of the longer wave length, means for controlling the amplitude of lines of deformation of the other of said gratings in response to the other of said electrical signals, a light mask positioned in the path of light transmitted from said medium, said mask having two pairs of transparent slots, each of said slots being positioned in a line orthogonal to said lines of deformation, each of said slots being displaced in position from the path of undeviated light from said medium, one of said pairs of slots lying on one side and the other of said pairs lying on the other side of said path, each of said slots being of the same width and separated by opaque bar portions of the same width, the slots remote from said path being positioned to pass substantially first order light of said one color component diffracted by said one grating and the second order light of the other of said components diffracted by said other grating, the slots adjacent said path being positioned to pass substantially all first order light of said components diffracted by said third grating and to pass first order light of said other color component diffracted by said other grating.

8. A system for simultaneously controlling point by point the intensity of each of a pair of color components consisting of red and blue in a beam of light in response to respective electrical signals comprising a light modulating medium, means for directing said beam on said light modulating medium, means for simultaneously producing two sets of deformations in said medium, the deformations in each set being arranged in uniformly spaced lines to form respective light diffracting gratings, the lines in each set extending in the same direction, one of said diffraction gratings having a line to line spacing smaller than the other of said gratings, said sets of gratings having similarly directed lines forming a third diffraction grating of line to line spacing which is uniform and greater than the line to line spacing of either of said other gratings, means for controlling the amplitude of the lines of deformations of said one grating in response to the one of said electrical signals corresponding to the red color component, means for controlling the amplitude of lines of deformation of the other of said gratings in response to the other of said electrical signals, a light mask positioned in the path of light transmitted from said medium, said mask having two pairs of transparent slots, each of said slots being positioned in a line orthogonal to said lines of deformation, each of said slots being displaced in position from the path of undeviated light from said medium, one of said pairs of slots lying on one side and the other of said pairs lying on the other side of said path, each of said slots being of the same width and separated by opaque bar portions of the same width, the slots remote from said path being positioned to pass substantially first order light of the red color component diffracted by said one grating and the second order light of the blue color component diffracted by said other grating, the slots adjacent said path being positioned to pass substantially all first order light of said components diffracted by said third grating, and to pass first order light of said blue color component diffracted by said other grating, the line to line spacing of said one grating with respect to the line to line spacing of said other grating being substantially in the relation of two to three.

9. A system for simultaneously controlling point by point the intensity of each of a pair of color components in a plurality of beams of light in response to electrical signals comprising a light modulating medium, means for directing said beams on said light modulating medium, means for simultaneously producing two sets of deformations in said medium, the deformations in each set being arranged in uniformly spaced lines to form respective light diffracting gratings, the lines in each set extending in the same direction, one of said diffraction gratings having a line to line spacing smaller than the other of said gratings, said sets of gratings forming a third diffraction grating of line to line spacing which is uniform and greater than the line to line spacing of either of said other gratings, means for controlling the amplitude of the lines of deformation of said one grating in response to the one of said electrical signals corresponding to one of said color components of the longer length, means for controlling the amplitude of lines of deformation of the other of said gratings in response to the other of said electrical signals, a light mask positioned in the path of light transmitted from said medium, said mask having a plurality of transparent slots of equal width interleaved with a plurality of bars of equal width, each of said slots being positioned in a line orthogonal to said lines of deformation, four successive slots forming a set of slots with respect to a beam the undeviated path of which intersects the center bar associated with said set of four slots, the slots in said set remote from said path being positioned to pass substantially first order light of said one color component diffracted by said one grating and second order light of said other color component diffracted by said other grating, the slots adjacent said path being positioned to pass substantially all first order light of said components diffracted by said third grating and to pass first order light of said other color component diffracted by said other grating.

10. The combination, in a light diffraction system, of a transparent light diffracting medium deformable by electric charges placed thereon, means to deflect an electron beam over said medium in two mutually perpendicular directions at line and frame rates to form a raster, means to modulate said beam in one of said directions over said medium corresponding to the direction of line deflection at a fixed frequency corresponding to one primary color component of a color image, and to an extent dependent on the intensity of said color component to form a diffraction grating therein having lines directed in said one direction, means to deflect said beam in the other of said direction over said medium at a second different fixed frequency, and to an extent dependent on the intensity of a second primary color component, and at a third different fixed frequency and to an extent dependent on the intensity of a third primary color component to form a second and third diffraction grating having similarly directed lines and corresponding, respectively, to said two other primary colors, the higher in frequency of asid second and third fixed frequencies corresponding to the longer in wave colors, the higher in frequency of said second and third diffraction gratings forming a fourth grating corresponding to the beat between said second and third gratings, the line to line spacing of said fourth grating being greater than the line to line spacing of either of said second and third gratings, a mask having a first set of parallel slots and bars parallel to said first direction and a second set of parallel slots and bars parallel to said other direction, means to pass light of said one primary color through said medium and said first set of slots and to pass light of said two other primary colors through said medium and said second set of slots, said second set of slots being positioned to pass light passed by the fourth grating in said medium having a deviation less than deviation of first order diffracted light passed by each of said second and third diffraction gratings.

11. The combination, in a light diffraction system, of a transparent light diffracting medium deformable by electric charges placed thereon, means to deflect an electron beam over said medium in two mutually perpendicular directions at line and frame rates to form a raster, means to modulate said beam in one of said directions over said medium corresponding to the direction of line deflection at a fixed frequency corresponding to a green primary color component of a color image, and to an extent dependent on the intensity of said color component to form a diffraction grating therein having lines directed in said one direction, means to deflect said beam in the other of said directions over said medium at a second different fixed frequency, and to an extent dependent on the intensity of a red primary color component, and at a third different fixed frequency and to an extent dependent on the intensity of a blue primary color component to form a second and third diffraction grating having similarly directed lines and corresponding respectively to said blue and red primary color components, said second and fixed frequency being higher than said third fixed frequency, the difference of said second and third fixed frequencies being less than either of said second and third fixed frequencies, said second and third diffraction gratings forming a fourth grating corresponding to the beat between said second and third gratings, a mask having a first set of parallel slots and bars parallel to said first direction and a second set of parallel slots and bars parallel to said other direction, means to pass light of said green primary color through said medium and said first set of slots and to pass light of said red and blue primary colors through said medium and said second set of slots, said second set of slots being positioned to pass light passed by the fourth grating in said medium having deviation less than the deviation of first order diffracted light passed by each of said second and third diffraction gratings and to pass first order red light and first and second order blue light.

12. The combination, in a light diffraction system, of a transparent light diffracting medium deformable by electric charges placed thereon, means to deflect an electron beam over said medium in two mutually perpendicular directions at line and frame rates to form a raster, means to modulate said beam in one of said directions over said medium corresponding to the direction of line deflection at a fixed frequency corresponding to one primary color component of a color image, and to an extent dependent on the intensity of said color component to form a diffraction grating therein having lines directed in said one direction, means to deflect said beam in the other of said directions over said medium at a second different fixed frequency, and to an extent dependent on the intensity of a second primary color component, and at a third different fixed frequency and to an extent dependent on the intensity of a third primary color component to form a second and third diffraction grating having similarly directed lines and corresponding respectively to said two other primary colors, the higher in frequency of said second and third fixed frequencies corresponding to the longer in wave length of said other primary colors, said second and third diffraction gratings forming a fourth grating corresponding to the beat between said second and third gratings, the line to line spacing of said fourth grating being greater than the line to line spacing of either of said second and third gratings, a mask having a first set of parallel slots and bars parallel to said first direction and a second set of parallel slots and bars parallel to said other direction, each of said slots in said second group being of substantially the same width and each of said bars being of substantially the same width, means to pass light of said one primary color through said medium and said first set of slots and to pass light of said two other primary colors through said medium and said second set of slots, said second set of slots being positioned to pass first order light of said longer wave length component and first and second order light of said shorter wave length component and to pass light passed by the fourth grating having a deviation less than the deviation of first order diffracted light passed by each of said second and third gratings.

13. The combination, in a light diffraction system of a transparent light diffracting medium deformable by electric charges placed thereon, means to deflect an electron beam over said medium in two mutually perpendicular directions at line and frame rates to form a raster, means to modulate said beam in one of said directions over said medium corresponding to the direction of line deflection at a fixed frequency corresponding to one primary color component of a color image, and to an extent dependent on the intensity of said color component to form a diffraction grating therein having lines directed in said one direction, means to deflect said beam in the other of said directions over said medium at a second different fixed frequency, and to an extent dependent on the intensity of a second primary color component, and at a third different fixed frequency and to an extent dependent on the intensity of a third primary color component to form a second and third diffraction grating having similarly directed lines and corresponding respectively to said other two primary colors, said second fixed frequency being higher than said third fixed frequency, the difference of said second and third fixed frequencies being less than either of said second and third fixed frequencies, said second fixed frequency corresponding to the longer in wave length of said other primary colors, said second and third diffraction gratings forming a fourth grating corresponding to the beat between said second and third gratings, a mask having a first set of parallel slots and bars parallel to said first direction and a second set of parallel slots and bars parallel to said other direction, means to pass a plurality of beams of light of said one primary color through said medium and said first slots and to pass a plurality of beams of light of said two other primary colors through said medium and said other slots, each adjacent pair of said other slots being positioned to pass first order light of said secondary primary component and first and second order light of said third primary component and to pass light passed by the fourth grating having deviation less than deviation of first order diffracted light passed by said second and third gratings.

References Cited by the Examiner

UNITED STATES PATENTS

| | | | |
|---|---|---|---|
| 2,919,302 | 12/1959 | Glenn | 178—5.4 |
| 3,044,358 | 7/1962 | Glenn | 178—5.4 |
| 3,078,338 | 2/1963 | Glenn | 178—5.4 |

DAVID G. REDINBAUGH, *Primary Examiner.*

J. A. O'BRIEN, *Assistant Examiner.*